United States Patent [19]

Cleaves

[11] 4,307,876
[45] Dec. 29, 1981

[54] ENERGY ABSORPTION APPARATUS

[76] Inventor: Thomas E. Cleaves, 5006 W. 30th Place, Cicero, Ill. 60650

[21] Appl. No.: 38,701

[22] Filed: May 14, 1979

[51] Int. Cl.³ .............................. F16F 1/26; E02B 3/22
[52] U.S. Cl. ..................................... 267/139; 14/71.1; 405/212; 256/13.1; 293/123
[58] Field of Search ...................... 14/69.5, 71.1, 71.3, 14/76; 405/212; 293/123; 256/13.1; 114/219; 267/158, 139

[56] References Cited

U.S. PATENT DOCUMENTS

| 1,680,548 | 8/1928 | Keiser | 404/6 X |
| 2,489,869 | 11/1949 | Dunn | 14/71.1 X |
| 2,817,102 | 12/1957 | Harris | 14/71.3 |
| 2,879,985 | 3/1959 | Waddell | 267/139 |
| 2,963,178 | 12/1960 | Wacker | 14/71.1 X |
| 3,280,414 | 10/1966 | Layne | 14/71.3 |
| 3,332,666 | 7/1967 | Gray | 404/6 X |
| 3,493,984 | 2/1970 | Reinhard | 14/71.3 |
| 3,514,088 | 5/1970 | Tosler | 267/139 X |
| 3,596,303 | 8/1971 | Kelley | 14/71.3 |
| 3,840,930 | 10/1974 | Waddell | 14/71.3 |

Primary Examiner—Nile C. Byers, Jr.
Attorney, Agent, or Firm—Dressler, Goldsmith, Shore, Sutker & Milnamow, Ltd.

[57] ABSTRACT

Energy-absorption apparatus for truck docks constructed and arranged to withstand impact of semi-trailers backing into a truck dock without damage to the dock over a long period of time. The apparatus of the invention includes a plurality of spring steel leaves disposed in dependent relation from a point above the level of the dock to a point below the dock level so as to accommodate truck trailers of varying heights.

5 Claims, 3 Drawing Figures

ENERGY ABSORPTION APPARATUS

SUMMARY

Prior to the present invention various types of absorption devices were used on truck docks. These devices ranged from arcs cut from truck tires to free-formed rubber bumpers that wrapped around the upper edge of the truck dock. A chief disadvantage of rubber bumpers is that their effective life is rather limited because of the forces developed by a backing semi-trailer. In some cases rubber bumpers become cracked between the bottom surface of the back trailer ledge and the top of the dock so that, after the trailer is loaded, the bumper is compressed further and is pulled off as the trailer leaves the dock. A principal object of the invention is to provide an absorption device that will accommodate countless impacts by truck trailers without damage, and which is constructed and arranged to accommodate trailers of different heights. In particular, the invention comprises a pair of absorption assemblies, each including a pivotally-mounted spring steel leaf, the pivot point being situated above the level of the truck dock to accommodate trailers having a high cargo deck and in which the leaf spring, upon impact, extends downwardly on a metal plate, thus absorbing the energy of the impact.

DESCRIPTION OF THE PREFERRED EMBODIMENT

Figure 1:
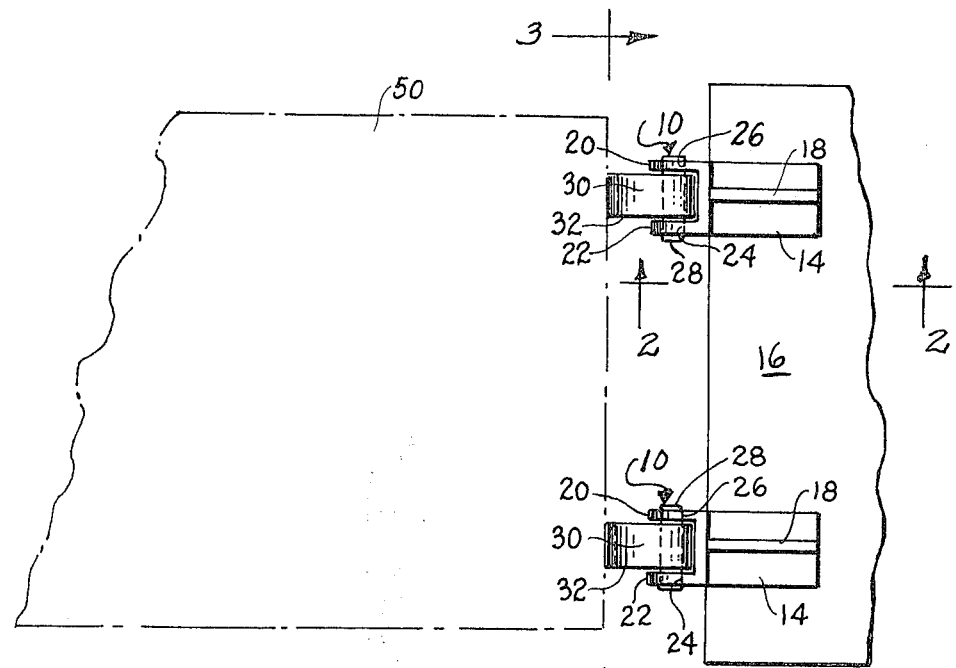
FIG. 1 is a fragmentary plan view of the energy absorption apparatus of the present invention.
Figure 3:
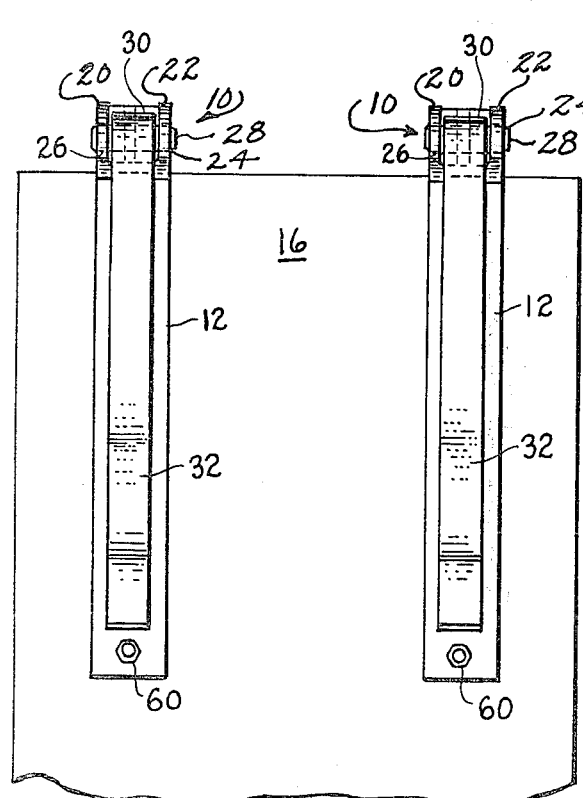
FIG. 3 is a view taken substantially on line 3—3 of FIG. 1.

Referring now to the drawings, and more particularly to FIG. 1, the energy absorption apparatus of the present invention comprises a plurality of absorption assemblies 10. Each absorption assembly is identical, and it is understood that there may be more than two of these assemblies, if required.

Figure 2:
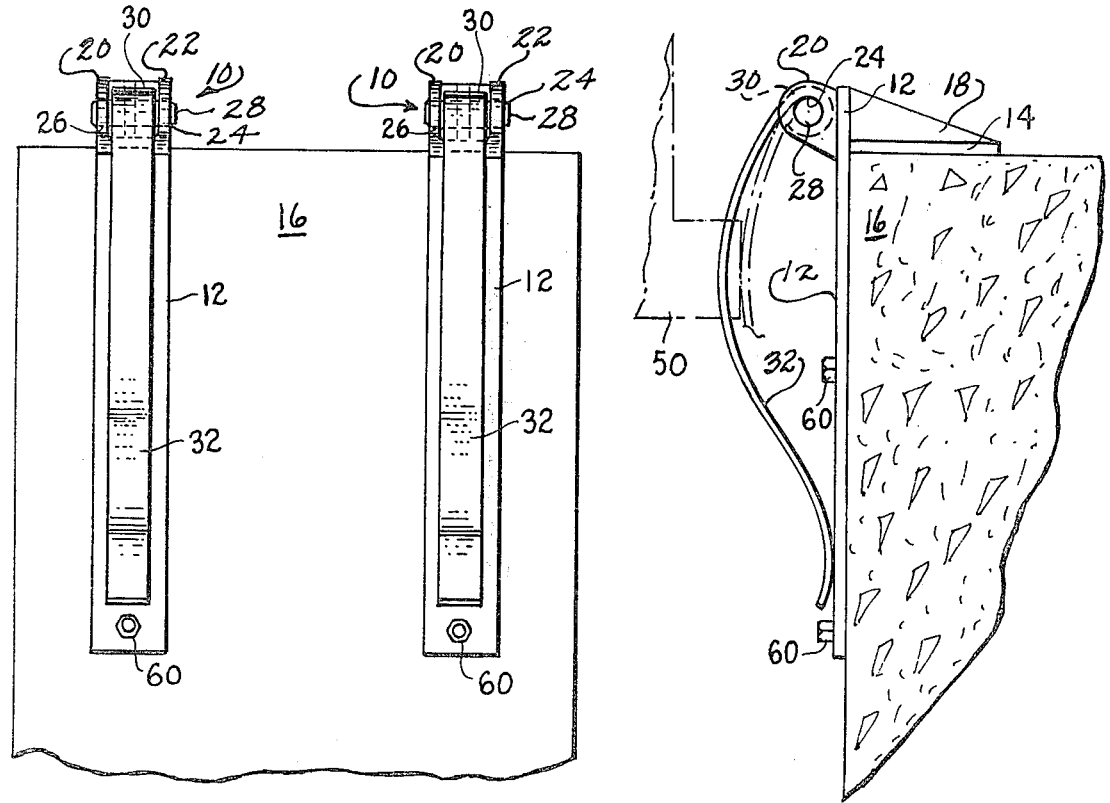
FIG. 2 is a fragmentary enlarged elevational view taken substantially on line 2—2 of FIG. 1.

Each assembly 10 includes a base plate 12 and a plate 14 secured to the plate 12 by any suitable means, such as welding or the like. A pair of fasteners 60 secure the base plate 12 to the dock 16. The plate 12 extends above the level upper of the dock 16, as illustrated in FIG. 2, and a triangular support number 18 is secured to the plate 14 and the upper marginal edge of the plate 12 by any suitable means, such as welding or the like.

Each assembly 10 includes a pair of outwardly extending lugs 20 and 22 apertured at 24 and 26 for reception of a pin 28, which passes through a curved portion 30 of leaf spring 32. As the truck trailer 50 backs into the dock, the leaf spring 32 is compressed (shown in phantom in FIG. 2) so that the lower end of the leaf spring is brought into sliding relationship to the lower end of the base plate 12. By this means the energy of the impact of the truck trailer 50 is absorbed by the several energy-absorption assemblies 10.

The energy absorption assembly of the present invention exhibits important advantages over devices in the prior art. For instance, applicant has found that an energy-absorption device made in accordance with the present invention is superior to those made of rubber in that it has longer life and can absorb many more impacts of greater magnitude than similar energy absorption devices heretofore known.

The leaves 32 may be wider than illustrated or there may be more than one leaf 32 mounted on a single assembly. In lieu of the triangular brace 18 a flat brace may extend from the upper edge of the base plate 12 to the outer edge of the plate 14 throughout the entire length of the plate 14.

I claim:

1. Energy absorption apparatus for a truck dock defining an upper horizontal surface and adjoining downwardly disposed vertical surface, comprising: at least one generally L-shaped base assembly having a first flat plate adapted to overlie the upper surface of the dock, a second flat plate secured to the vertical surface of the dock and to said first flat plate substantially perpendicularly thereto, and a plurality of apertured lugs extending outwardly from one surface of said second plate; and a leaf spring having one end mounted for pivotal movement on said lugs and an opposite free end disposed downwardly from said lugs and adapted to slidably bear against said one surface of said second plate, whereby said free end of said leaf spring extends downwardly along said one surface when an oncoming truck or trailer compressingly engages said leaf spring at a position intermediate its ends, the force of compression holding the truck or trailer at a spaced distance from the vertical surface of the dock.

2. Apparatus in accordance with claim 1, wherein the upper end of said second plate extends beyond the upper surface of said first plate and wherein said leaf spring defines an outwardly disposed curved portion intermediate its ends, whereby said leaf spring is engaged before said L-shaped frame when said truck or trailer is driven into said dock.

3. Apparatus in accordance with claim 2, wherein said lugs are mounted on said second plate above the level of the juncture with said first plate, further including reinforcing means between the upper marginal portion of said second plate and the upper surface of said first plate, whereby the force of engagement of a truck or trailer backing into said dock is distributed along the horizontal and vertical surfaces of said dock.

4. Apparatus in accordance with claim 3 wherein said leaf spring is pivotally mounted on pin received in aligned apertures in said lugs.

5. Apparatus in accordance with claim 4, wherein a plurality of said assemblies are dispersed in a transverse spaced relation to absorb energy from trucks or trailers backed into the dock at varying angles to the vertical surface of said dock.

* * * * *